US006744619B1

United States Patent
Feger (12)

(10) Patent No.: US 6,744,619 B1
(45) Date of Patent: Jun. 1, 2004

(54) CONDUCTIVE ELECTROLYTE SYSTEM WITH VISCOSITY REDUCING CO-SOLVENTS

(75) Inventor: Christopher Feger, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 10/319,253

(22) Filed: Dec. 12, 2002

(51) Int. Cl.[7] ................................................ H01G 9/42
(52) U.S. Cl. .................... 361/506; 361/504; 204/129.1; 29/25.03
(58) Field of Search ................ 361/506, 504, 361/507; 204/129.1, 129.75; 252/62.2; 29/25.03

(56) References Cited

U.S. PATENT DOCUMENTS

| 4,518,471 A | 5/1985 | Arora | 204/129.1 |
| 4,525,249 A | 6/1985 | Arora | 204/129.75 |
| 4,860,169 A | 8/1989 | Dapo | 361/506 |
| 5,131,188 A | 7/1992 | Hutchison et al. | 128/419 D |
| 5,715,133 A | 2/1998 | Harrington et al. | 361/500 |

*Primary Examiner*—Anthony Dinkins
(74) *Attorney, Agent, or Firm*—Steven M. Mitchell

(57) ABSTRACT

The present invention is directed to a conductive electrolyte for use in high voltage electrolytic capacitors and to an electrolytic capacitor impregnated with the electrolyte of the present invention for use in an implantable cardioverter defibrillator (ICD). The electrolyte according to the present invention is composed of a two solvent mixture of ethylene glycol and a polar organic cosolvent. Dissolved in this mixture is a combination of: a high dielectric cosolvent, a long chain monocarboxylic acid and an aliphatic dicarboxylic acid of carbon chain length from eight to thirteen ($C_8$ to $C_{13}$). The solution is then neutralized with an amine. A cathode depolarizer, or degassing agent may be added to reduce the amount of gas produced during capacitor life. Hypophosphorous acid may be added to enhance the life characteristics of the electrolyte. The water content may be adjusted with deionized water to achieve a Karl Fischer titration (water content) measurement of about 1.0% to about 8.0% to achieve proper age characteristics.

34 Claims, 2 Drawing Sheets

US 6,744,619 B1

CONDUCTIVE ELECTROLYTE SYSTEM WITH VISCOSITY REDUCING CO-SOLVENTS

BACKGROUND OF THE INVENTION

1. Field of the Invention

The present invention is directed to a conductive electrolyte for high voltage electrolytic capacitors and to an electrolytic capacitor impregnated with the electrolyte of the present invention for use in an implantable cardioverter defibrillator (ICD).

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

In ICDs, as in other applications where space is a critical design element, it is desirable to use capacitors with the greatest possible capacitance per unit volume. Since the capacitance of an electrolytic capacitor is provided by the anodes, a clear strategy for increasing the energy density in the capacitor is to minimize the volume taken up by paper and cathode and maximize the number of anodes. A multiple anode stack configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them.

Typically, an implantable cardioverter defibrillator may utilize two 350 to 400 volt electrolytic capacitors in series to achieve a voltage of 700 to 800 volts. However, with the prospect for treatment of ventricular tachycardia with higher voltage pulses (up to 1000 volts), the need for a capacitor with a working voltage of greater than 400 volts becomes pronounced. There are numerous commercially available compositions of electrolyte for use in electrolytic capacitors that can conform to reasonable specifications, as long as the operating voltage of the capacitor remains at 400 volts or lower. However, once this limit is exceeded, the choices become more limited. Electrolytes that have working voltages of greater than 400 volts and high conductivities are in short supply.

There are relatively few electrolytes for this voltage range, and the suitable electrolytes known in the art have several drawbacks, especially when used in a flat, stacked capacitor having a multiple anode configuration, First, glycol-based electrolytes suffer from relatively poor conductivity and ionic mobility. These electrolytes will produce a capacitor with significant energy loss due to a higher than acceptable equivalent series resistance (ESR). Second, γ-butyrolactone based electrolytes, which overcome the problems of ionic mobility, can not be used in conjunction with typical paper spacer pads. These require thicker, more expensive pads made out of manila fibers, and as a result of greater thickness, sharply reduce the energy density in flat stacked capacitor designs.

Many high voltage electrolytes employ the use of very long chain dicarboxylic acids and large bases to achieve the necessary breakdown voltages, however, the resultant electrolytes have very low conductivities ($\leq 1$ mS/cm). For example, U.S. Pat. No. 4,860,169 to Dapo discloses an electrolytic capacitor for use in operation at voltages above 500 volts, produced by employing an electrolyte containing a straight chain saturated aliphatic dicarboxylic acid in which the carboxylic moieties are separated by at least 14 carbon atoms in a mixture of at least one polar organic solvent and water. The disclosed composition has a resistivity at 30° C. of 1280 Ω·cm (781 $\mu$S/cm), a pH of 9.68, Scintillation voltage of 500V and viscosity of about 14 cP.

Of these existing systems, most achieve reasonable breakdown voltages and high conductivity at the expense of viscosity. What is needed in the art is an electrolyte, for use in a flat capacitor with a multiple anode stack configuration, with high conductivity and breakdown voltage, but which also has a low viscosity, allowing it to reach all portions of the anode surface area with a conductive pathway. Typical electrolytes consisting solely of ethylene glycol and one or more dicarboxylic acids, such as sebacic, azelaic, or suberic acid exhibit viscosities in excess of 15 centipoises at 37° C., depending on the amount of water present in the electrolyte. Modest gains in viscosity can be achieved by increasing water content, but often at expense of electrolyte breakdown voltage and oxide stability over time within the finished capacitor.

SUMMARY OF THE INVENTION

The present invention is directed to a conductive electrolyte for use in high voltage electrolytic capacitors in which the viscosity is modified using one or more cosolvents, and to an electrolytic capacitor impregnated with the electrolyte of the present invention for use in an implantable cardioverter defibrillator (ICD). Either in lieu of or in addition to water inclusion, one or more cosolvents are added to an electrolyte mixture to reduce the total final viscosity of the solution.

Accordingly, the electrolyte according to the present invention comprises a two solvent mixture of ethylene glycol and a polar organic cosolvent. Preferred cosolvents consist of any of several alcohols including $C_1$–$C_4$ alkanols, such as ethyl alcohol, propyl alcohol, isopropyl alcohol, and butanol, as well as the alkoxy alcohols, such as the $C_1$–$C_4$ alkoxy alkanols, including the alkoxy substituted ethanols (known as "Cellosolves") 2-methoxyethanol, 2-ethoxyethanol, and 2-butoxyethanol. Further, dissolved in this mixture is a combination of: a high dielectric cosolvent (such as acetonitrile, propylene carbonate or dimethyl sulfoxide (DMSO)), a long chain monocarboxylic acid ($C_{12}$ to $C_{18}$) (such as lauric acid or stearic acid), and an aliphatic dicarboxylic acid of carbon chain length from eight to thirteen ($C_8$ to $C_{13}$) (Such as suberic, azelaic, sebacic, undecanedioic, dodecanedioic, or brassylic acid). The solution is then neutralized with an amine, such as ammonia, dimethylamine, trimethylamine, diethylamine, triethylamine, ethanolamine, diethanolamine, triethanolamine, and diisopropylethylamine. A cathode depolarizer, or degassing agent, from the group of nitro-substituted aromatic compounds (nitroaromatics), including nitrobenzene, nitrotoluene, nitrophenol, nitroacetophenone, nitrobenzyl alcohol, and nitroanisole, can be optionally added to reduce the amount of gas produced during capacitor life. Lastly, hypophosphorous acid can be optionally added to enhance the life characteristics of the electrolyte, resulting in lower leakage currents and better voltage droop characteristics. The water content can be adjusted with deionized water to achieve a Karl Fischer titration (water content) measurement of about 1.0% to about 8.0% to achieve proper age characteristics.

A representative composition according to the present invention that displays the desired properties is:

69.6% by weight ethylene glycol;
10.7% by weight 2-methoxyethanol;
5.8% by weight acetonitrile;
3.8% by weight azelaic acid;
1.9% by weight lauric acid;
3.9% by weight ammonium hydroxide (30% in water);
0.1% by weight hypophosphorous acid (50% in water)
1.0% by weight o-nitroanisole; and
3.2% by weight deionized water.

The electrolyte according to the present invention, when impregnated in an electrolytic capacitor, has high conductivity and breakdown voltage, while maintaining a low viscosity, allowing it to reach all portions of the anode surface area with a conductive pathway. Due to the low viscosity, this electrolyte system can be used in multianode per layer stacked configuration aluminum electrolytic capacitors with greater total capacitance realization. Additionally, these electrolytes will result in capacitors with greater stability due to the fact that low amounts of water can be used, while achieving low viscosity.

BRIEF DESCRIPTION OF THE DRAWINGS/FIGURES

DETAILED DESCRIPTION OF THE INVENTION

Figure 1:
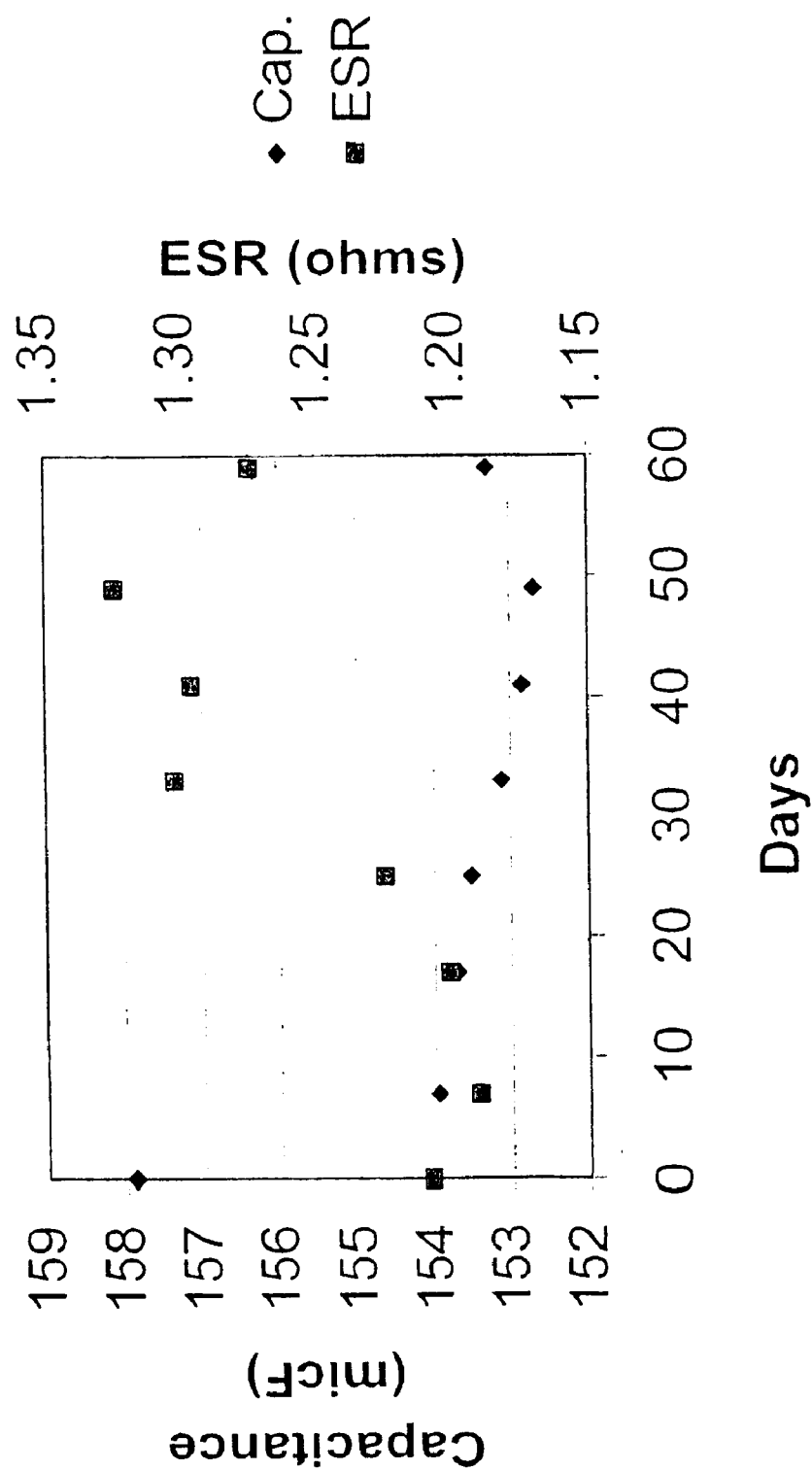
FIG. 1 shows the life performance of a capacitor impregnated with an electrolyte according to one embodiment of the present invention, particularly, the capacitance and equivalent series resistance (ESR) over a 60 day test period.

The present invention is directed to a high voltage, highly conductive electrolyte for electrolytic capacitors and to an electrolytic capacitor impregnated with the electrolyte of the present invention for use in an ICD. The electrolyte according to the present invention may be used in a capacitor operating at a working voltage greater than 400 V, allowing for the possibility of a defibrillator that has a paired voltage greater than 800 V.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

The electrolyte according to the present invention comprises a two solvent mixture of ethylene glycol and a polar organic cosolvent. Useful cosolvents include $C_1$–$C_4$ alkanols, such as ethyl alcohol, propyl alcohol, isopropyl alcohol, and butanol, as well as the $C_1$–$C_4$ alkoxy alkanols, such as the alkoxy substituted ethanols (known as "Cellosolves") that include 2-methoxyethanol, 2-ethoxyethanol, and 2-butoxyethanol. Further, dissolved in this mixture is a combination of: a high dielectric cosolvent (such as acetonitrile, propylene carbonate or dimethyl sulfoxide (DMSO)), a long chain monocarboxylic acid ($C_{12}$ to $C_{18}$) (such as lauric acid or stearic acid), and an aliphatic dicarboxylic acid of carbon chain length from eight to thirteen ($C_8$ to $C_{13}$) (such as suberic, azelaic, sebacic, undecanedioic, dodecanedioic, or brassylic acid). The solution is then neutralized with an amine, such as ammonia, dimethylamine, trimethylamine, diethylamine, triethylamine, ethanolamine, diethanolamine, triethanolamine, and diisopropylethylamine. A cathode depolarizer, or degassing agent, from the group of nitro-substituted aromatic compounds (nitroaromatics), including nitrobenzene, nitrotoluene, nitrophenol, nitroacetophenone, nitrobenzyl alcohol, and nitroanisole, can be optionally added to reduce the amount of gas produced during capacitor life. Lastly, hypophosphorous acid can be optionally added to enhance the life characteristics of the electrolyte, resulting in lower leakage currents and better voltage droop characteristics. The water content can be adjusted with deionized water to achieve a Karl Fischer titration (water content) measurement of about 1.0% to about 8.0% to achieve proper age characteristics.

The electrolyte according to the present invention can be composed of the following ranges of components: about 60% to about 80% by weight ethylene glycol, about 2% to about 30% by weight of a polar organic cosolvent, about 0% to about 10% by weight of a high dielectric constant cosolvent, about 0% to about 10% by weight of an aliphatic dicarboxylic acid of carbon chain length from eight to thirteen ($C_8$ to $C_{13}$), about 0% to about 5% of a long chain monocarboxylic acid ($C_{12}$ to $C_{18}$) (such as lauric acid or stearic acid), about 0% to about 3s% boric acid, about 2% to about 5% by weight of an amine, about 0% to about 3% by weight of a nitro-substituted aromatic compound as a degassing agent, about 0% to about 2% by weight hypophosphorous acid, about 0% to about 8% by weight water and about 0% to about 1% anhydrous ammonia.

A representative composition according to the present invention that displays the desired properties is: 69.6% by weight ethylene glycol, 10.7% by weight 2-methoxyethanol, 5.8% by weight acetonitrile, 3.8% by weight azelaic acid, 1.9% by weight lauric acid, 3.9% by weight ammonium hydroxide (30% in water), 0.1% by weight hypophosphorous acid (50% in water), 1.0% by weight o-nitroanisole and 3.2% by weight deionized water. The electrolyte may be further neutralized with anhydrous ammonia to achieve a pH of about 6.0 to about 10.0, preferably a pH of about 6.5 to about 8.5.

An exemplary electrolyte made according to this representative composition exhibited a conductivity (resistivity) of 4.60 mS/cm (217Ω-cm), a pH of 9.04, a Karl Fischer titration (water content) measurement of 6.21% at 36.4° C., an open cup scintillation voltage of 425 V, and a viscosity of 7.2 cP at 37.0° C. A capacitor impregnated with the electrolyte according to the present invention may have a working voltage of greater than 400 V, preferably about 400 V to about 440 V, allowing for the possibility of a defibrillator that has a paired voltage of greater than 800 V.

An electrolytic capacitor according to the present invention is constructed of anode and cathode layers, stacked with a paper insulator or spacer between each layer. The anode layer is composed of one or more anode foils stacked together without any paper spacer, to form a high energy density anode element. The anode and cathode layers are then grouped together in a parallel connection to produce sufficient capacitance for the intended function. This finished stack is inserted into a case with a geometry closely following the contour of the stack, and designed to minimize the space occupied inside the finished defibrillator. A wound roll configuration may also be used, as would be apparent to those skilled in the relevant art.

Aluminum foil is preferred for the anode and cathode layers, because of its ability to produce a sufficient quality oxide layer, its conductive properties, and its wide commercial availability. Other valve metal foils conventionally utilized in electrolytic capacitors could also be used, including titanium, tantalum, magnesium, niobium, zirconium and zinc. Preferably, a strip of unetched, high purity (99.99%) aluminum foil with high cubicity, wherein at least 85% of the crystalline aluminum structure is oriented in a normal position (i.e., a (1,0,0) orientation) relative to the surface of the foil, is used. Such foils are well-known in the art and are readily available from commercial sources known to those skilled in the art.

The anode foil may be etched in an aqueous halide based etch solution, typically a hydrochloric acid or sodium chloride solution, according to a conventional etch process; for example, U.S. Pat. No. 5,715,133 to Harrington et al. describes a suitable method of etching foil and is incorporated herein by reference in its entirety. The etch solution preferably consists of about 1.3% by weight sodium chloride, about 3.5% by weight sodium perchlorate, about 0.35% sodium persulfate, and deionized water. The etch solution preferably is heated to a temperature in the range of about 60° C. to about 95° C., more preferably 85° C. The foil is etched at a DC current density of about 0.01 A/cm$^2$ to about 0.30 A/cm$^2$, preferably 0.15 A/cm$^2$. A charge of about 20 coulombs/cm$^2$ to 100 coulombs/cm$^2$ is passed through the foil during the etching process, with about 50 coulombs/cm$^2$ preferred, which requires a time in the range of about 2 minutes and 13 seconds to about 11 minutes and 7 seconds, with about 5 minutes and 30 seconds preferred.

The foil is then removed from the etch solution and rinsed in deionized water. The tunnels formed during the initial etch are then widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. No. 4,518,471 and U.S. Pat. No. 4,525,249, both of which are incorporated herein by reference.

After the etch tunnels have been widened, the foil is again rinsed with deionized water and dried. Finally, a barrier oxide layer may be formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in the poor performance and reliability of an electrolytic capacitor. In particular, a high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100–1000 µS/cm, preferably 500 µS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt.

The etched and formed anode foils are cut and the capacitor is assembled. An electrolytic capacitor stack according to the present invention consists of a number of units of: cathode, a paper spacer, one or more anodes, a paper spacer and cathode, with neighboring units sharing the cathode between them.

The electrolyte of the present invention is then prepared. In one embodiment, initially, ethylene glycol is heated to about 60° C. and the acids are added. A temperature of about 60° C. is desirable, because the acids are reasonably soluble at this temperature, however, higher or lower temperatures can be used without departing from the scope of this invention. In a preferred embodiment, wherein boric acid is used, the solution temperature is then raised to about 120° C. and held in the range of about 120° C. to about 130° C. for one hour. The solution is then cooled to about 90° C. or lower and the degassing agent is added. Nitroacetophenone is soluble but not volatile at 90° C. Nitroanisole should be added at a temperature below about 50° C. to prevent its volatilization. The solution is allowed to cool to below about 60° C. and the polar organic cosolvent and high dielectric cosolvent are added. A temperature below 60° C. will prevent volatilization of the low boiling point solvents. The solution is further cooled to below about 30° C. and water, hypophosphorous acid and ammonium hydroxide are stirred in. The electrolyte may be further neutralized with anhydrous ammonia to achieve a final pH of about 6.0 to about 10.0, preferably a pH of about 6.5 to about 8.5.

The pre-assembled capacitor is then vacuum impregnated with the electrolyte of the present invention, by placing the capacitor in contact with the electrolyte and reducing the pressure to less than 50 cm Hg. The capacitor is held at this low pressure for 5 to 45 minutes with a preferred time of 15 minutes, and then pressure is restored, using the pressure to force the electrolyte mixture into the capacitor stack. The capacitor is then removed and placed in an oven at a temperature of about 65 EC to about 90 EC with a preferred temperature of 90 EC and a maximum oxygen atmospheric concentration of 2% for a period of about 2 hours to about 24 hours, with a preferred time of 4 hours. The capacitor is then aged in a normal manner by applying the working voltage to the capacitor, allowing the capacitor to reach this voltage, and then allowing the current to decrease.

Electrolytic capacitors according to the present invention can be incorporated into implantable medical devices, such as implantable cardioverter defibrillators (ICDs), as would be apparent to one skilled in the art, as described in U.S. Pat. No. 5,522,851.

Having now generally described the invention, the same will be more readily understood through reference to the following examples which are provided by way of illustration, and are not intended to be limiting of the present invention.

EXAMPLES

Example 1

An electrolyte was prepared having the following formulation.

| | |
|---|---|
| Ethylene Glycol | 856.2 g |
| Azelaic Acid | 63.0 g |
| Boric Acid | 10.6 g |
| o-nitroanisole | 10.5 g |
| Ammonium Hydroxide | 12.6 g |
| Water | 52.6 g |

Initially, the ethylene glycol was heated to 60° C. in a one liter (1 L) beaker and the azelaic acid and boric acid were added. The solution temperature was then raised to 120° C. and held at 120–125° C. for one hour. The solution was then cooled to 50° C. and the o-nitroanisole, water and ammonium hydroxide were stirred in. The solution was further neutralized with a titration of anhydrous ammonia to a final pH (36.2° C.) of 7.54. The prepared electrolyte exhibited a conductivity of 4.73 mS/cm.

Example 2

12.6 g of ethylene glycol were added to 143.6 g of the electrolyte prepared in Example 1. The prepared electrolyte exhibited a pH(30.2° C.) of 7.61 and a conductivity of 3.64 mS/cm. Additional water was added to achieve an average Karl Fischer titration (water content) measurement of 6.56%. A conductivity of 4.67 mS/cm, pH of 7.47 and an open cup scintillation voltage of 415 V were observed at 36.9° C.

Slide capacitors composed of a 1"×3" glass slide sandwich consisting of either a single or a double layer anode interleaved between three 0.25 mil Kraft paper spacers and a conventional cathode (having a cathode-paper-anode(s)-paper-cathode arrangement) were impregnated with the prepared electrolyte. The single anode capacitor exhibited a capacitance of 3.3963 $\mu$F, an ESR of 25.18$\Omega$ and a breakdown voltage of 463 V. When employed in a dual-anode layer capacitor arrangement, the capacitor obtained a capacitance of 6.3405 $\mu$F and an ESR of 49.19$\Omega$. An index of refraction, $n_D$(20° C.) of 1.4351 and an average viscosity of 12.56 cP were observed.

Example 3

6.3 g of ethylene glycol and 4.2 g of acetonitrile were added to 143.6 g of the electrolyte prepared in Example 1. The prepared electrolyte exhibited a pH(28.5° C.) of 7.67 and a conductivity of 3.77 mS/cm. Additional water was added to achieve an average Karl Fischer titration (water content) measurement of 6.27%. A conductivity of 4.52 mS/cm, pH of 7.52 and an open cup scintillation voltage of 460 V were observed at 36.1° C.

Slide capacitors composed of a 1"×3" glass slide sandwich consisting of either a single or a double layer anode interleaved between three 0.25 mil Kraft paper spacers and a conventional cathode (having a cathode-paper-anode(s)-paper-cathode arrangement) were impregnated with the prepared electrolyte. The single anode capacitor exhibited a capacitance of 3.3066 $\mu$F, an ESR of 21.25$\Omega$ and a breakdown voltage of 433 V. When employed in a dual-anode layer capacitor arrangement, the capacitor obtained a capacitance of 6.3198 $\mu$F and an ESR of 56.78$\Omega$. An index of refraction, $n_D$(20° C.) of 1.4323 and an average viscosity of 12.35 cP were observed.

Example 4

6.5 g of ethylene glycol and 7.8 g of methoxyethanol were added to 143.7 g of the electrolyte prepared in Example 1. The prepared electrolyte exhibited a pH(29.2° C.) of 7.67 and a conductivity of 3.54 mS/cm. Additional water was added to achieve an average Karl Fischer titration (water content) measurement of 6.41%. A conductivity of 4.70 mS/cm, pH of 7.56 and an open cup scintillation voltage of 411 V were observed at 37.3° C.

Slide capacitors composed of a 1"×3" glass slide sandwich consisting of either a single or a double layer anode interleaved between three 0.25 mil Kraft paper spacers and a conventional cathode (having a cathode-paper-anode(s)-paper-cathode arrangement) were impregnated with the prepared electrolyte. The single anode capacitor exhibited a capacitance of 3.4018 $\mu$F, an ESR of 23.06$\Omega$ and a breakdown voltage of 460 V. When employed in a dual-anode layer capacitor arrangement, the capacitor obtained a capacitance of 5.9446 $\mu$F and an ESR of 67.21$\Omega$. An index of refraction, $n_D$(20° C.) of 1.4339 and an average viscosity of 12.58 cP were observed.

Example 5

7.7 g of methoxyethanol and 4.2 g of acetonitrile were added to 143.6 g of the electrolyte prepared in Example 1. The prepared electrolyte exhibited a pH(27.5° C.) of 7.73 and a conductivity of 3.60 mS/cm. Additional water was added to achieve an average Karl Fischer titration (water content) measurement of 6.49%. A conductivity of 5.07 mS/cm, pH of 7.55 and an open cup scintillation voltage of 433 V were observed at 37.3° C.

Slide capacitors composed of a 1"×3" glass slide sandwich consisting of either a single or a double layer anode interleaved between three 0.25 mil Kraft paper spacers and a conventional cathode (having a cathode-paper-anode(s)-paper-cathode arrangement) were impregnated with the prepared electrolyte. The single anode capacitor exhibited a capacitance of 3.4708 $\mu$F, an ESR of 22.11$\Omega$ and a breakdown voltage of 440 V. When employed in a dual-anode layer capacitor arrangement, the capacitor obtained a capacitance of 6.3164 $\mu$F and an ESR of 51.21$\Omega$. An index of refraction, $n_D$(20° C.) of 1.4317 and an average viscosity of 9.95 cP were observed.

Example 6

15.4 g of methoxyethanol were added to 143.6 g of the electrolyte prepared in Example 1. The prepared electrolyte exhibited a pH(28.0° C.) of 7.72 and a conductivity of 3.44 mS/cm. Additional water was added to achieve an average Karl Fischer titration (water content) measurement of 6.39%. A conductivity of 4.45 mS/cm, pH of 7.62 and an open cup scintillation voltage of 401 V were observed at 36.2° C.

Slide capacitors composed of a 1"×3" glass slide sandwich consisting of either a single or a double layer anode interleaved between three 0.25 mil Kraft paper spacers and a conventional cathode (having a cathode-paper-anode(s)-paper-cathode arrangement) were impregnated with the prepared electrolyte. The single anode capacitor exhibited a capacitance of 3.3070 μF, an ESR of 20.58Ω and a breakdown voltage of 443 V. When employed in a dual-anode layer capacitor arrangement, the capacitor obtained a capacitance of 6.3794 μF and an ESR of 41.02Ω. An index of refraction, $n_D(20° C.)$ of 1.4327 and an average viscosity of 10.98 cP were observed.

Example 7

8.4 g of acetonitrile were added to 143.6 g of the electrolyte prepared in Example 1. The prepared electrolyte exhibited a pH(25.6° C.) of 7.74 and a conductivity of 3.76 mS/cm. Additional water was added to achieve an average Karl Fischer titration (water content) measurement of 6.67%. A conductivity of 5.29 mS/cm, pH of 7.61 and an open cup scintillation voltage of 410 V were observed at 36.6° C.

Slide capacitors composed of a 1"×3" glass slide sandwich consisting of either a single or a double layer anode interleaved between three 0.25 mil Kraft paper spacers and a conventional cathode (having a cathode-paper-anode(s)-paper-cathode arrangement) were impregnated with the prepared electrolyte. The single anode capacitor exhibited a capacitance of 3.3009 μF, an ESR of 24.04Ω and a breakdown voltage of 409 V. When employed in a dual-anode layer capacitor arrangement, the capacitor obtained a capacitance of 6.0042 μF and an ESR of 52.62Ω. An index of refraction, $n_D(20° C.)$ of 1.4308 and an average viscosity of 9.41 cP were observed.

Example 8

An electrolyte was prepared having the following formulation:

| | |
|---|---|
| Ethylene Glycol | 108.7 g |
| 2-methoxyethanol | 16.7 g |
| Acetonitrile | 9.1 g |
| Azelaic Acid | 6.0 g |
| Lauric Acid | 3.0 g |
| Ammonium Hydroxide | 6.0 g |
| Hypophosphorous acid | 0.2 g |
| o-nitroanisole | 1.5 g |
| Water | 5.0 g |

Initially, the ethylene glycol, azelaic acid, lauric acid, water, hypophosphorous acid and ammonium hydroxide were heated to 65° C. in a 200 ml tall form beaker. The solution was then cooled to 30° C. and the remaining ingredients were added and stirred in. The prepared electrolyte exhibited a pH (25.2° C.) of 8.82 and a conductivity of 3.30 mS/cm. Additional water was added to achieve an average Karl Fischer titration (water content) measurement of 6.21%. A conductivity of 4.60 mS/cm, pH of 9.04 and an open cup scintillation voltage of 425 V were observed at 36.6° C.

Slide capacitors composed of a 1"×3" glass slide sandwich consisting of either a single or a double layer anode interleaved between three 0.25 mil Kraft paper spacers and a conventional cathode (having a cathode-papers-anode(s)-papers-cathode arrangement) were impregnated with the prepared electrolyte. The single anode capacitor exhibited a capacitance of 3.4428 μF, an ESR of 23.18Ω and a breakdown voltage of 435 V. When employed in a dual-anode layer capacitor arrangement, the capacitor obtained a capacitance of 6.3297 μF and an ESR of 48.84Ω. An index of refraction, $n_D(20° C.)$ of 1.4255 and an average viscosity of 7.18 cP were observed.

Three test units were impregnated with the prepared electrolyte and aged. The test units were made up using a multi anode stacked configuration having thirteen layers of two anodes and one layer of one anode. The following results were obtained:

| Test Unit | Capacitance (μF) | ESR (Ω) | Rise Time (sec) | Leakage Current (μA) (1 minute) | Leakage Current (μA) (5 minutes) |
|---|---|---|---|---|---|
| 4007423 | 154.14 | 1.461 | 17.9 | 256.71 | 191.22 |
| 4921023 | 157.35 | 1.177 | 17.7 | 197.08 | 138.85 |
| 4010505 | 162.19 | 0.9875 | 18.2 | 228.91 | 164.96 |

Figure 2:
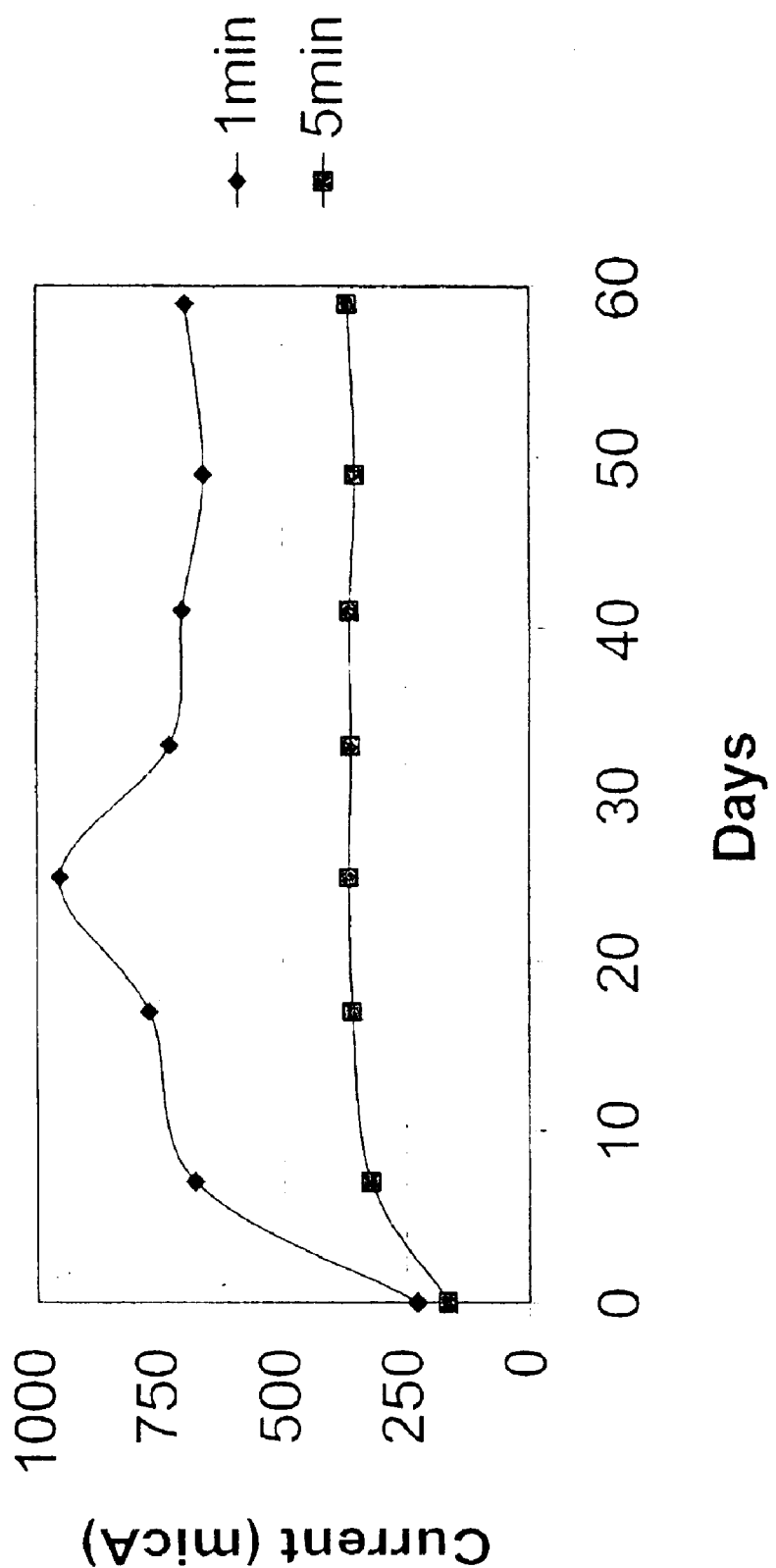
FIG. 2 shows the life performance of a capacitor impregnated with an electrolyte according to one embodiment of the present invention, particularly, the leakage currents at one and five minutes over a 60 day test period.

The test units were stored, unbiased in a 65° C. oven. Approximately every eight days, the capacitors were removed from the oven and the capacitance, equivalent series resistance (ESR) and leakage currents at one and five minutes were measured, indicating a stable electrolyte system over a 60 day test period. FIG. 1 and FIG. 2 show the life performance of the test units.

Four additional test units rated to 430 volts were impregnated with the prepared electrolyte and aged. The odd numbered test units were made up using a multi anode stacked configuration having ten layers of three anodes and the even numbered test units were made up using a multi anode stacked configuration having eight layers of four anodes. The following results were obtained:

| Test Unit | Capacitance (μF) | ESR (Ω) | Rise Time to 430 V at 5 mA current (sec) | Leakage Current (μA) (1 minute) | Leakage Current (μA) (5 minutes) |
|---|---|---|---|---|---|
| 1047017 | 175.811 | 0.9376 | 18.89 | 256.67 | 188.57 |
| 1047018 | 183.659 | 1.4922 | 20.04 | 286.28 | 209.80 |
| 1047021 | 170.613 | 1.3748 | 18.76 | 277.10 | 198.03 |
| 1047022 | 180.275 | 1.7886 | 19.93 | 237.45 | 171.16 |

Example 9

An electrolyte was prepared having the following formulation:

| | |
|---|---|
| Ethylene Glycol | 507.4 g |
| Azelaic Acid | 42.0 g |
| Boric Acid | 7.0 g |
| 2-nitroanisole | 7.0 g |

Initially, the ethylene glycol was placed in a 1 L beaker and heated to 60° C. The azelaic and boric acids were then added, and the solution temperature was raised heated to 120° C. and held at 120–130° C. for one hour. The solution was then cooled to 50° C. and the o-nitroanisole was added and thoroughly stirred in.

Example 10

33.3 g of 2-methoxyethanol and 1.8 g of ammonium hydroxide were added to 120.7 g of the electrolyte prepared in Example 9. The Solution was further neutralized with a titration of anhydrous ammonia to a final pH (31.0° C.) of 7.05. The prepared electrolyte exhibited a conductivity of 2.94 mS/cm. Additional water was added to achieve an average Karl Fischer titration (water content) measurement of 1.59%. A conductivity of 3.49 mS/cm, pH of 6.92 and an open cup scintillation voltage of 421 V were observed at 36.7° C.

Slide capacitors composed of a 1"×3" glass slide sandwich consisting of either a single or a double layer anode interleaved between three 0.25 mil Kraft paper spacers and a conventional cathode (having a cathode-paper-anode(s)-paper-cathode arrangement) were impregnated with the prepared electrolyte. The single anode capacitor exhibited a capacitance of 3.4733 $\mu$F, an ESR of 19.77$\Omega$ and a breakdown voltage of 440 V. When employed in a dual-anode layer capacitor arrangement, the capacitor obtained a capacitance of 6.4385 $\mu$F and an ESR of 42.14$\Omega$. An index of refraction, $n_D$(20° C.) of 1.4327 and an average viscosity of 10.93 cP were observed.

Three test units were impregnated with the prepared electrolyte and aged. The test units were made up using a multi anode stacked configuration having thirteen layers of two anodes and one layer of one anode. The following results were obtained:

| Test Unit | Capacitance ($\mu$F) | ESR ($\Omega$) | Rise Time (sec) | Leakage Current ($\mu$A) (1 minute) | Leakage Current ($\mu$A) (5 minutes) |
| --- | --- | --- | --- | --- | --- |
| 4015221 | 167.76 | 0.9322 | 18.8 | 269.34 | 185.69 |
| 4924132 | 159.76 | 1.129 | 17.9 | 252.91 | 174.00 |
| 4908026 | 153.48 | 1.238 | 17.4 | 246.38 | 172.09 |

Four additional test units rated to 430 volts were impregnated with the prepared electrolyte and aged. The odd numbered test units were made up using a multi anode stacked configuration having ten layers of three anodes and the even numbered test units were made up using a multi anode stacked configuration having eight layers of four anodes. The following results were obtained.

| Test Unit | Capacitance ($\mu$F) | ESR ($\Omega$) | Rise Time to 430 V at 5 mA current (sec) | Leakage Current ($\mu$A) (1 minute) | Leakage Current ($\mu$A) (5 minutes) |
| --- | --- | --- | --- | --- | --- |
| 1047013 | 173.597 | 1.1785 | 18.45 | 241.47 | 176.78 |
| 1047015 | 171.434 | 1.2028 | 18.44 | 269.29 | 197.50 |
| 1047016 | 180.666 | 2.1642 | 19.88 | 291.89 | 204.49 |
| 1047019 | 172.370 | 1.1725 | 18.57 | 261.46 | 181.23 |

Example 11

39.5 g of 2-ethoxyethanol and 1.8 g of ammonium hydroxide were added to 120.7 g of the electrolyte prepared in Example 9. The solution was further neutralized with a titration of anhydrous ammonia to a final pH (35.2° C.) of 8.35. The prepared electrolyte exhibited a conductivity of 3.06 mS/cm. Additional water was added to achieve an average Karl Fischer titration (water content) measurement of 1.61%. A conductivity of 3.41 mS/cm, pH of 8.37 and an open cup scintillation voltage of 435 V were observed at 37.0° C.

Slide capacitors composed of a 1"×3" glass slide sandwich consisting of either a single or a double layer anode interleaved between three 0.25 mil Kraft paper spacers and a conventional cathode (having a cathode-paper-anode(s)-paper-cathode arrangement) were impregnated with the prepared electrolyte. The single anode capacitor exhibited a capacitance of 3.5162 $\mu$F, an ESR of 38.76$\Omega$ and a breakdown voltage of 449 V. When employed in a dual-anode layer capacitor arrangement, the capacitor obtained a capacitance of 5.3604 $\mu$F and an ESR of 87.08$\Omega$. An index of refraction, $n_D$(20° C.) of 1.4340 and an average viscosity of 12.03 cP were observed.

Three test units were impregnated with the prepared electrolyte and aged. The test units were made up using a multi anode stacked configuration having thirteen layers of two anodes and one layer of one anode. The following results were obtained:

| Test Unit | Capacitance ($\mu$F) | ESR ($\Omega$) | Rise Time (sec) | Leakage Current ($\mu$A) (1 minute) | Leakage Current ($\mu$A) (5 minutes) |
| --- | --- | --- | --- | --- | --- |
| 4924307 | 160.87 | 1.061 | 17.9 | 249.92 | 176.18 |
| 4003626 | 154.66 | 1.651 | 18.2 | 249.16 | 168.10 |
| 48115803 | 165.66 | 1.576 | 19.0 | 272.47 | 189.97 |

Example 12

33.3 g 2-methoxyethanol and 2.0 g dimethyl amine (40% solution in $H_2O$) were added to 120.7 g of the electrolyte prepared in Example 9. The solution was further neutralized with a titration of anhydrous ammonia to a final pH (31.0° C.) of 7.02. The prepared electrolyte exhibited a conductivity of 2.51 mS/cm. Additional water was added to achieve an average Karl Fischer titration (water content) measurement of 1.68%. A conductivity of 3.67 mS/cm, pH of 6.85 and an open cup scintillation voltage of 424 V were observed at 36.6° C.

Slide capacitors composed of a 1"×3" glass slide sandwich consisting of either a single or a double layer anode interleaved between three 0.25 mil Kraft paper spacers and a conventional cathode (having a cathode-paper-anode(s)-paper-cathode arrangement) were impregnated with the prepared electrolyte. The single anode capacitor exhibited a capacitance of 3.3067 $\mu$F, an ESR of 30.92$\Omega$ and a breakdown voltage of 420 V. When employed in a dual-anode layer capacitor arrangement, the capacitor obtained a capacitance of 5.2229 $\mu$F and an ESR of 75.80$\Omega$. An index of refraction, $n_D$(20° C.) of 1.4325 and an average viscosity of 10.03 cP were observed.

Three test units were impregnated with the prepared electrolyte and aged. The test units were made up using a multi anode stacked configuration having thirteen layers of two anodes and one layer of one anode. The following results were obtained:

| Test Unit | Capacitance ($\mu F$) | ESR ($\Omega$) | Rise Time (sec) | Leakage Current ($\mu A$) (1 minute) | Leakage Current ($\mu A$) (5 minutes) |
|---|---|---|---|---|---|
| 4911624 | 162.56 | 1.349 | 19.2 | 370.72 | 273.45 |
| 4007013 | 161.53 | 0.9616 | 18.2 | 285.05 | 198.89 |
| 4007918 | 166.75 | 0.9051 | 18.7 | 304.92 | 212.64 |

Four additional test units rated to 430 volts were impregnated with the prepared electrolyte and aged. The odd numbered test units were made up using a multi anode stacked configuration having ten layers of three anodes and the even numbered test units were made up using a multi anode stacked configuration having eight layers of four anodes. The following results were obtained:

| Test Unit | Capacitance ($\mu F$) | ESR ($\Omega$) | Rise Time to 430 V at 5 mA current (sec) | Leakage Current ($\mu A$) (1 minute) | Leakage Current ($\mu A$) (5 minutes) |
|---|---|---|---|---|---|
| 1047009 | 173.344 | 0.9988 | 18.63 | 251.19 | 173.07 |
| 1047014 | 180.585 | 1.6251 | 19.78 | 312.92 | 225.43 |
| 1047020 | 180.684 | 1.7450 | 19.90 | 347.69 | 267.21 |

Example 13

39.5 g of 2-ethoxyethanol and 2.0 g dimethyl amine (40% solution in $H_2O$ were added to 120.7 g of the electrolyte prepared in Example 9. The solution was further neutralized with a titration of anhydrous ammonia to a final pH (32.0° C.) of 6.98. The prepared electrolyte exhibited a conductivity of 2.62 mS/cm. Additional water was added to achieve an average Karl Fischer titration (water content) measurement of 1.63%. A conductivity of 3.03 mS/cm, pH of 6.84 and an open cup scintillation voltage of 449 V were observed at 36.1° C.

Slide capacitors composed of a 1"×3" glass slide sandwich consisting of either a single or a double layer anode interleaved between three 0.25 mil Kraft paper spacers and a conventional cathode (having a cathode-paper-anode(s)-paper-cathode arrangement) were impregnated with the prepared electrolyte. The single anode capacitor exhibited a capacitance of 3.3498 $\mu F$, an ESR of 25.28$\Omega$ and a breakdown voltage of 398 V. When employed in a dual-anode layer capacitor arrangement, the capacitor obtained a capacitance of 3.6207 $\mu F$ and an ESR of 98.46$\Omega$. An index of refraction, $n_D(20°$ C.) of 1.4330 and an average viscosity of 10.47 cP were observed.

Three test units were impregnated with the prepared electrolyte and aged. The test units were made up using a multi anode stacked configuration having thirteen layers of two anodes and one layer of one anode. The following results were obtained:

| Test Unit | Capacitance ($\mu F$) | ESR ($\Omega$) | Rise Time (sec) | Leakage Current ($\mu A$) (1 minute) | Leakage Current ($\mu A$) (5 minutes) |
|---|---|---|---|---|---|
| 4952835 | 173.28 | 1.110 | 19.5 | 349.27 | 250.49 |
| 4917414 | 161.04 | 1.493 | 18.4 | 329.76 | 239.96 |
| 4907725 | 159.99 | 1.540 | 18.1 | 256.69 | 183.07 |

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A conductive electrolyte for high voltage electrolytic capacitors, comprising:
   ethylene glycol;
   a polar organic solvent;
   a high dielectric constant cosolvent;
   a dicarboxylic acid
   a monocarboxylic acid; and
   an amine.

2. An electrolyte according to claim 1, wherein said polar organic solvent is an alkanol.

3. An electrolyte according to claim 2, wherein said polar organic solvent is ethyl alcohol.

4. An electrolyte according to claim 2, wherein said polar organic solvent is propyl alcohol.

5. An electrolyte according to claim 2, wherein said polar organic solvent is isopropyl alcohol.

6. An electrolyte according to claim 2, wherein said polar organic solvent is butanol.

7. An electrolyte according to claim 1, wherein said polar organic solvent is an alkoxy alcohol.

8. An electrolyte according to claim 7, wherein said polar organic solvent is 2-methoxyethanol.

9. An electrolyte according to claim 7, wherein said polar organic solvent is 2-ethoxyethanol.

10. An electrolyte according to claim 7, wherein said polar organic solvent is 2-butoxyethanol.

11. An electrolyte according to claim 1, wherein said high dielectric constant cosolvent is selected from the group consisting of acetonitrile, propylene carbonate and dimethyl sulfoxide (DMSO).

12. An electrolyte according to claim 1, wherein said dicarboxylic acid is an aliphatic dicarboxylic acid of carbon chain length from eight to thirteen ($C_8$ to $C_{13}$).

13. An electrolyte according to claim 12, wherein said aliphatic dicarboxylic acid is selected from the group consisting of suberic acid, azelaic acid, sebacic acid, undecanedioic acid, dodecanedioic acid and brassylic acid.

14. An electrolyte according to claim 1, wherein said monocarboxylic acid is a long chain monocarboxylic acid of carbon chain length from twelve to eighteen ($C_{12}$ to $C_{18}$).

15. An electrolyte according to claim 14, wherein said long chain monocarboxylic acid is selected from the group consisting of lauric acid and stearic acid.

16. An electrolyte according to claim 1, wherein said amine is selected from the group consisting of ammonia, dimethylamine, trimethylamine, diethylamine, triethylamine, ethanolamine, diethanolamine, triethanolamine and diisopropylethylamine.

17. An electrolyte according to claim 1, further comprising hypophosphorous acid.

18. An electrolyte according to claim 1, further comprising a cathode depolarizer.

19. An electrolyte according to claim 18, wherein said cathode depolarizer is a nitro-substitute aromatic compound.

20. An electrolyte according to claim 19, wherein said nitro-substituted aromatic compound is selected from the group consisting of: nitrobenzene, nitrotoluene, nitrophenol, nitroacetophenone, nitrobenzyl alcohol and nitroanisole.

21. An electrolyte according to claim 1, wherein said electrolytic capacitor has a working voltage of greater than 400 V.

22. A conductive electrolyte for high voltage electrolytic capacitors, comprising ethylene glycol, 2-methoxyethanol, acetonitrile, azelaic acid, lauric acid, o-nitroanisole, hypophosphorous acid, ammonium hydroxide and water.

23. An electrolyte according to claim 22, comprising
about 60% to about 80% by weight ethylene glycol;
about 2% to about 30% by weight 2-methoxyethanol;
not more than about 10% acetonitrile;
not more than about 10% by weight azelaic acid;
not more than about 5% by weight lauric acid;
not more than about 3% by weight o-nitroanisole;
not more than about 1% by weight hypophosphorous acid;
about 2% to about 5% by weight ammonium hydroxide; and
not more than about 8% by weight water.

24. An electrolyte according to claim 22, comprising 69.6% by weight ethylene glycol, 10.7% by weight 2-methoxyethanol, 5.8% acetonitrile, 3.8% azelaic acid, 1.9% lauric acid, 1.0% by weight o-nitroanisole, 0.1% by weight hypophosphorous acid (50% in water), 3.9% by weight ammonium hydroxide (30% in water) and 3.2% by weight water.

25. An electrolytic capacitor impregnated with the conductive electrolyte of claim 1.

26. An electrolytic capacitor impregnated with the conductive electrolyte of claim 22.

27. An implantable cardioverter defibrillator (ICD) comprising an electrolytic capacitor impregnated with the conductive electrolyte of claim 1.

28. An implantable cardioverter defibrillator (ICD) comprising an electrolytic capacitor impregnated with the conductive electrolyte of claim 22.

29. A method of making a conductive electrolyte for high voltage electrolytic capacitors, comprising:
(1) mixing an ethylene glycol solvent, a polar organic solvent, a high dielectric constant cosolvent, a dicarboxylic acid and a monocarboxylic acid, to form a first solution, and
(2) adding an amine to said solution to neutralize the pH of said solution.

30. A method according to claim 29 wherein step (1) is performed in the following order:
(a) mixing an ethylene glycol solvent with a dicarboxylic acid and a monocarboxylic acid,
(b) adding a polar organic solvent; and
(c) adding a high dielectric constant cosolvent.

31. A method according to claim 29 further comprising the step of:
(3) adding a hypophosphorous acid.

32. A method according to claim 29 further comprising the step of:
(3) adding a cathode depolarizer.

33. A method according to claim 29, wherein step (2) achieves a final pH of said solution of about 6.0 to about 10.0.

34. A method according to claim 33, wherein step (2) achieves a final pH of said solution of about 6.5 to about 7.5.

* * * * *